Nov. 2, 1965   J. J. RADOVITZ   3,215,375
NYLON TAPE SLACK ELIMINATOR
Filed July 7, 1964   2 Sheets-Sheet 1
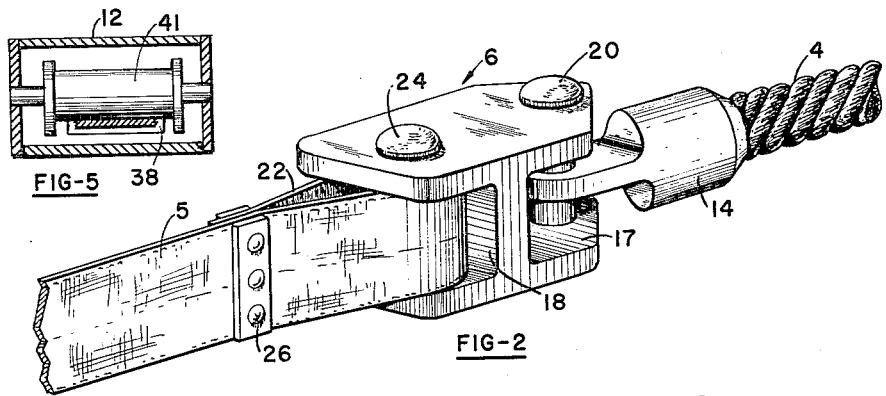
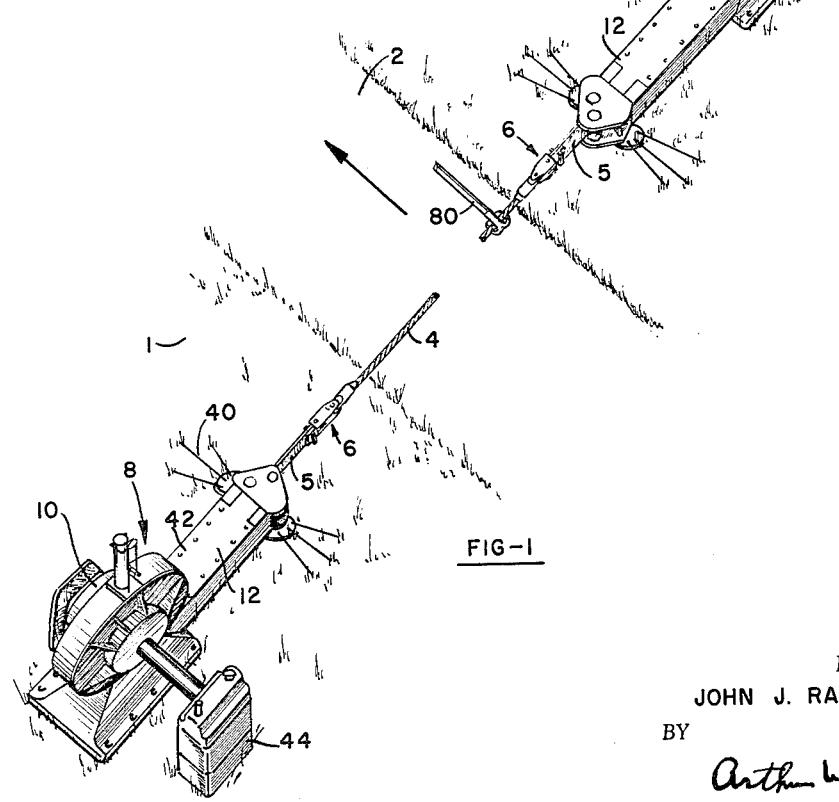
INVENTOR.
JOHN J. RADOVITZ
BY
Arthur L. Collins
ATTORNEY

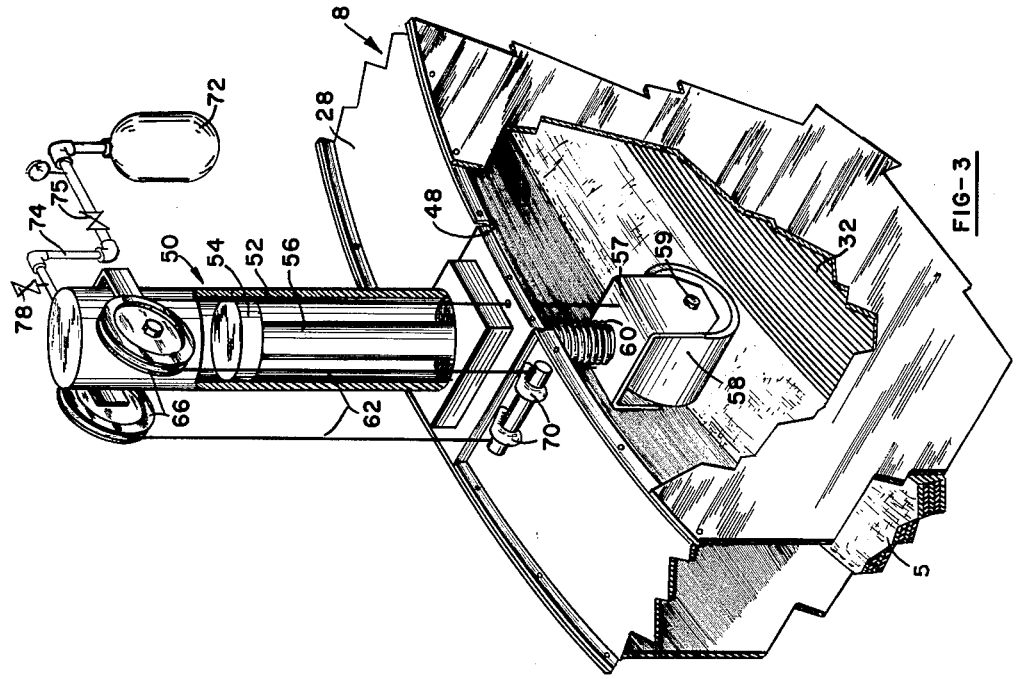
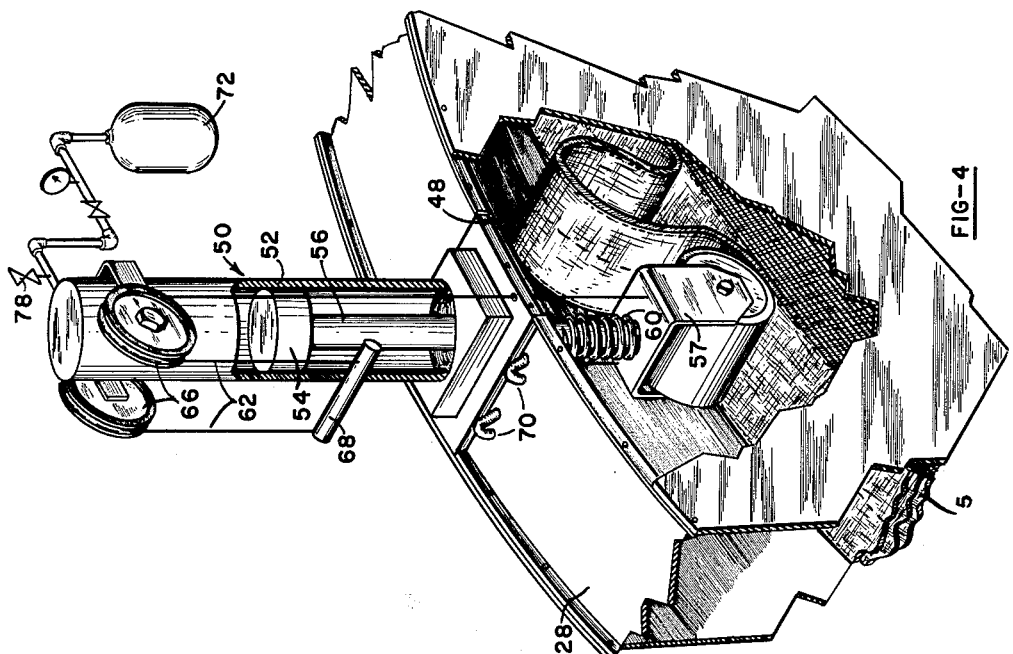

United States Patent Office 3,215,375
Patented Nov. 2, 1965

3,215,375
NYLON TAPE SLACK ELIMINATOR
John J. Radovitz, Clifton Heights, Pa., assignor, by mesne assignments, to the United States of America as represented by the Secretary of the Navy
Filed July 7, 1964, Ser. No. 380,966
5 Claims. (Cl. 244—110)

This invention relates to arresting devices for halting the forward movement of an aircraft that has landed. In particular, the invention concerns the mechanism for winding the arresting lines.

In aircraft arresting gear, it is usual to have a line, or pendant, stretched across the runway. The line is led over pulleys on either side of the runway to reels which are connected with braking mechanism. A tension is applied to the line by the braking mechanism which is sufficient to maintain it in a raised position above the landing surface. A hook suspended from the aircraft making the landing engages the line and pulls it along the runway. This causes the braking mechanism to apply an arresting force considerably larger than the tension force in order that, as the aircraft runs its predetermined landing distance, the energy is absorbed and the aircraft brought to rest. The arresting force is applied gradually and increasingly to avoid undue stresses in the line and in the aircraft.

Because of the speed and weight of the aircraft, the peak load on the arresting line is at the initial engagement of the aircraft's hook with it. Slackness or restriction in paying out the line will often result in its breaking. The wrapping of the line on the reels is thus important, and especially on the initial or radially outermost coils of line which are payed out; the wrapping of the other coils of line, which are payed out later is not too critical and some slackness may be said to be desirable.

With this in mind, the object of this invention is to provide means in arresting gear to assure the coiling of an arresting line on a reel in a manner to be most beneficial for the intended use.

FIG. 1 is a perspective view showing a landing surface equipped with arresting gear employing the invention.

FIG. 2 is a perspective view of the coupler joining the pendant to the tapes.

FIG. 3 is a perspective view, with some parts broken away, of a portion of the reel showing and tape tensioner as it appears in preparation of an arrestment.

FIG. 4 is similar to FIG. 3, but shows the tensioner positioned during a rewinding of the tape.

FIG. 5 is an end view of the fairlead as seen from the the reel.

FIG. 6 is similar to FIG. 5 but viewed from the runway.

Referring to the drawing, in FIG. 1, the numeral 1 indicates a landing surface having a runway 2 on which landings are made by aircraft moving in the direction of the arrow. An arrest pendant 4 crosses the runway 2 and has its end terminate at the sides of it. There is a tape 5, secured to each end of the pendant 4, by a coupler 6, which extends from a reel 8 by way of a fairlead 12. An arresting engine 10 is connected to the reel 8.

Since there is a duplication of equipment and structures at each end of the pendant, a single description is intended for both.

Pendant 4 is a non-extensible flexible member, preferably a metallic wire rope sufficiently long to stretch across the runway 2. The coupler 6 joining the pendant and tape includes an eye socket 14 secured to the end of the pendant and a tape connector 16 having bifurcations 17 and 18. The eye of the pendant socket 14 is received in the bifurcation 17 and secured by a bolt 20; whereas a loop 22, formed in the end of the tape 5, is received in the other bifurcation 18, and secured by another bolt 24. Loop 22 is formed by doubling back the end of the tape and securing it with rivets 26, as shown in FIG. 2.

The tape 5 is preferably a synthetic material such as nylon, which has a certain amount of resilience. It is stored on a reel 8 (FIG. 3) disposed at the side of the runway which is enclosed in a housing 28, having an opening, not shown, in the lower portion of its periphery, near the landing surface, through which the tape passes to the pendant. It is wound in coils 32, one upon the other, between flanges, not shown, of the reel and its running end 36 is fed off the top side of the reel, rather than its underside, as shown in FIGS. 3 and 4. As the tape 5 leaves the reel, it is horizontally disposed and enters a fairlead 12, located between the runway and the tape reel 8.

Fairlead 12 is a rectangularly shaped piece of metal which directs the tape and also reorients it from the horizontal position it has as it comes off the reel 8 to the vertical one shown at the coupler 6, in FIG. 1. It has a passage, not shown, through it which makes a half spiral. This achieves the reorientation of the tape and is indicated by the horizontal opening 38, at the reel end of the fairlead, in FIG. 5, and the vertical opening 39, on the runway end, in FIG. 6.

Guy lines 40 and pins 42, passing through fairlead 12, anchor it to the landing surface. To reduce wear of the tape 5, by friction with the fairlead 12, a horizontal roller 41 is mounted over the horizontal opening 38, and vertical rollers 42, flank the vertical opening 39.

To rewind the tape 5, a source of power, as the gas engine 44, is disengageably connected to the shaft 46, carrying the tape reel 8. An energy absorber shown at 10 is also coupled with the reel shaft 8. The manner of construction of these devices are not a part of this invention and therefore will not be discussed.

As shown in FIGS. 3 and 4, the peripheral wall of the housing 28, has an opening 48, at the top of the reel 8, over which a tape tensioner 50 is mounted. The latter element 50 includes a vertically disposed cylinder 52, having a reciprocable piston 54, with a piston rod 56, extending from its lower end. A U-shaped bracket 57, carrying a roller 58 on a shaft 59 between legs, is secured to the end of the piston rod 56. This is adapted to engage the top surface of the coiled tape on the reel when the piston 54 is in its lowered position. A spring 60, mounted on the piston rod 56, above the bracket 57, normally urges the roller downwardly.

A pair of cords 62 are secured to the bracket 57, which extend upwardly through apertures 64, in the reel housing 28. The cords 62 pass over pulleys 66, mounted to the outer surface of cylinder 52, near its top and are secured at their ends to a rigid member or handle 68. A pair of hooks 70, secured to the outer surface of the housing 28, are furnished to catch hold of handle 68. The handle 68 provides a means for raising the roller 58, and by its securement under the hooks 70, it will maintain it out of engagement with the tape, as shown in FIG. 3.

Near its upper end, the cylinder 52 is connected with a source of gas pressure 72, preferably air, by a conduit 74. A shut-off valve 76 of ordinary construction provides a means of admitting pressure to the cylinder, and a vent valve 78 is provided in a branch line connected to the conduit 74, between the shut-off valve 76, and the tensioner cylinder 52, for venting it.

In operation, when an arrestment is to be made, the tensioner roller 58 is raised by hooking the handle 68, under the hooks 70, as shown in FIG. 3. In the arrestment, an arrestment hook 80, FIG. 1, suspended from the aircraft, not shown, engages the pendant 4, and pulls it down the runway 2. Tape 5 is fed off the reel 8, and a braking force gradually applied to it through the energy absorber 10, to halt the aircraft.

After an arrestment, the arresting hook 80 is disengaged from the pendant 4. The tensioner roller 58 is then lowered into engagement with the tape 5, FIG. 4, in preparation for rewinding the tape and retracting the pendant. A requisite amount of gas, which is determined by the weight of aircraft and speed at which it is to be arrested, is admitted into the tensioner cylinder 52. For light craft at slow speeds, closing of the vent valve 78, and shut-off valve 78, whereby the air above the piston 54, in cylinder 52, is trapped, offers sufficient resistance for proper rewinding of the tape. When the tapes are rewound, the vent valve 78, is opened to allow the gas in the cylinder 52 to escape. The roller 58 is raised out of engagement with the tape by pulling on the handle 68. Securement of the handle 68, under the hooks 70, maintains the roller 58 clear of the tape, so that the tape may be unwound, in an arrestment, without its resistance.

Although the invention has been described with respect to one embodiment, obviously many modifications and variations are possible. It is therefore to be understood that within the scope of the appended claims, the invention may be practiced otherwise than as specifically described.

What is claimed is:

1. In an aircraft arresting gear having a pendant extending across a landing surface, an energy absorbing device, a tape secured to said pendant, a reel coupled with said energy absorber, said tape being wound on said reel for unwinding therefrom during an arrestment, means connected to said reel for rewinding said tape thereon, tape tensioning means disposed on said reel for tensioning said tape during winding thereof comprising:

a cylinder,
   a piston reciprocably mounted thereon,
   a piston rod secured to said piston and extending from said cylinder,
   a roller mounted on the end of said piston rod adapted to engage the outer surface of the tape coiled on said reel,
   means communicatively connected with the upper portion of said cylinder adapted to trap air above said piston during winding of said tape, said trapped air being compressed with winding of said tape and the coils of tape being wound increasingly tighter,
   means for venting said air above said piston after said tape has been rewound on said reel,
   and means for raising said piston to remove said roller out of contact with said tape so that unwinding of said tape may be performed without interference therewith.

2. In an aircraft arresting gear employing a tape,
   a reel adapted for winding said tape thereon in preparation of an arrestment,
   a tape tensioner mounted over said reel comprising a cylinder,
   a piston reciprocably mounted in said cylinder,
   a piston rod secured to said piston and extending from said cylinder,
   a roller secured to the end of said piston rod adapter to engage the outer surface of said tape wound on said reel,
   means communicatively connected with the upper end of said cylinder adapted to trap air above said piston whereby movement of said piston with coiling of said tape compresses said air and causes increasing tightness in winding of said tape,
   and means for venting said cylinder upon completion of winding of said tape.

3. The device of claim 2 including means for moving said roller out of contact with said tape to permit free unwinding thereof from said reel.

4. The device of claim 3 wherein said last named means comprises a cord secured to said roller, a pulley mounted on the upper end of said cylinder and a hook whereby said roller may be raised with a pull on said cord and then secured to said hook.

5. In an aircraft arresting gear employing a tape,
   a reel adapted for winding said tape thereon,
   a housing enclosing said reel having a first opening in the periphery thereof for passage of said tape and a second opening,
   a tape tensioner secured to said housing over said second opening comprising a cylinder,
   a piston reciprocably mounted in said cylinder,
   a piston rod secured to said piston extending from said cylinder into said second opening,
   a roller secured to the end of said piston rod adapted to engage the outer surface of said tape on said reel,
   a source of compressed gas,
   a conduit communicatively connecting said source of compressed gas with the upper end of said cylinder,
   a shut-off valve in said conduit for opening and closing the passage through said conduit,
   a second conduit connected to said first conduit between said cylinder and said shut-off valve,
   and a vent valve in said second conduit.

References Cited by the Examiner
UNITED STATES PATENTS

| 1,652,299 | 12/27 | Carpenter | 242—75.45 |
| 2,677,508 | 5/54 | Locke | 242—66 |
| 3,142,458 | 7/64 | Byrne et al. | 244—63 |

FERGUS S. MIDDLETON, *Primary Examiner.*